United States Patent
Prasad et al.

(10) Patent No.: US 12,402,102 B2
(45) Date of Patent: Aug. 26, 2025

(54) SYSTEMS AND METHODS FOR HANDLING NOTIFICATION MESSAGES IN A 5G NETWORK

(71) Applicant: NetScout Systems, Inc., Westford, MA (US)

(72) Inventors: Sandeep Prasad, San Jose, CA (US); Abhishek Saraswati, San Jose, CA (US); Massimiliano Frigieri, Modena (IT); Vijayalakshmi Seshadri, San Jose, CA (US); Pritish Aherrao, Pune (IN); Loreto Di Resta, Modena (IT); Tauras Liubinskas, Frankford, KY (US); Linda Nasi, Modena (IT)

(73) Assignee: NetScout Systems, Inc., Westford, MA (US)

( * ) Notice: Subject to any disclaimer, the term of this patent is extended or adjusted under 35 U.S.C. 154(b) by 416 days.

(21) Appl. No.: 18/155,244

(22) Filed: Jan. 17, 2023

(65) Prior Publication Data

US 2024/0188035 A1 Jun. 6, 2024

(30) Foreign Application Priority Data

Dec. 2, 2022 (IN) .............................. 202241069613

(51) Int. Cl.
*H04L 12/00* (2006.01)
*H04L 43/12* (2022.01)
*H04W 68/02* (2009.01)

(52) U.S. Cl.
CPC ............. *H04W 68/02* (2013.01); *H04L 43/12* (2013.01)

(58) Field of Classification Search
CPC ........ H04W 68/02; H04L 43/12; H04L 43/08; H04L 41/16; H04L 43/18; H04L 45/741
USPC ........................................................ 370/328
See application file for complete search history.

(56) References Cited

U.S. PATENT DOCUMENTS

2020/0195556 A1* 6/2020 Tang ..................... H04L 45/741
2022/0159347 A1 5/2022 Froehlich et al.

FOREIGN PATENT DOCUMENTS

EP 3 783 856 A1 2/2021
JP 2010166421 A * 7/2010

OTHER PUBLICATIONS

PCT International Search Report and Written Opinion dated Mar. 4, 2024 in International Application No. PCT/US2023/079715.
PCT International Prelim. Report on Patentability and Written Opinion dated Jun. 12, 2025 in International Application No. PCT/US2023/079715.

* cited by examiner

*Primary Examiner* — Frantz Coby
(74) *Attorney, Agent, or Firm* — Foley & Lardner LLP

(57) ABSTRACT

A method is disclosed. A control plane signaling data packet transmitted from a first node to a second node may be collected via a probe. An identifier of the second node may be identified. A determination as to whether the message is a notification message is made. A key performance indicator type for the control plane signaling data packet may be determined. A key performance indicator of the key performance indicator type may be generate from content of the control plane signaling data packet.

20 Claims, 8 Drawing Sheets

| Correlation-Id | NotificationURI |
|---|---|
| Location:: {apiRoot}/nudm-sdm/<apiVersion>/{supi}/sdm-subscriptions/{subscriptionId} | SdmSubscription:callbackReference |
| Location:: {apiRoot}/nudm-sdm/<apiVersion>/shared-data-subscriptions/{subscriptionId} | SdmSubscription:callbackReference |
| PolicyAssociationRequest:notificationUri | NpcfAMPolicyControl_UpdateNotify<br>NpcfAMPolicyControl_TerminateNotify |
| SmPolicyContextData:notificationUri | NpcfSMPolicyControl_UpdateNotify<br>NpcfSMPolicyControl_TerminateNotify |
| AppSessionContextReqData:notifUri | NpcfPolicyAuthorization_NotifyTerminate |
| EventsSubscReqData:notifUri | NpcfPolicyAuthorization_NotifyService |
| BdtReqData:notifUri | NpcfBDTPolicyControl_Notify |
| PolicyAssociationRequest:notificationUri | NpcfUEPolicyControl_UpdateNotify<br>NpcfUEPolicyControl_TerminateNotify |

FIG. 2B

| Message | JSON Object for Identification | Producer NF Type | Consumer NF Type | Payload String |
|---|---|---|---|---|
| NamfComm_N2InfoNotify | N2InformationNotification::n2NotifySubscriptionId | AMF | | N2InformationNotification |
| NamfComm_AMFStatusChangeNotify | AmfStatusChangeNotification::amfStatusInfoList | - | | AmfStatusChangeNotification |
| | AmfEventNotification::subsChangeNotifyCorrelationId | AMF | | |
| NudmSDM_ModificationNotification | ModificationNotification::notifyItems | UDM | | ModificationNotification |
| | DeregistrationData::accessType | UDM | | |
| NudmEE_EventOccuranceNotify | MonitoringReport::referenceId, MonitoringReport::eventType | UDM | | MonitoringReport |
| NpcfAMPolicyControl_UpdateNotify | PolicyUpdate::resourceUri | PCF | | PolicyUpdate |
| NpcfAMPolicyControl_TerminateNotify | TerminationNotification::resourceUri, TerminationNotification::cause | PCF | | TerminationNotification |
| NpcfSMPolicyControl_UpdateNotify | SmPolicyNotification::resourceUri, SmPolicyNotification::smPolicyDecision | PCF | | SmPolicyNotification |
| NpcfSMPolicyControl_TerminateNotify | TerminationNotification::resourceUri, TerminationNotification::cause | PCF | | TerminationNotification |
| NpcfPolicyAuthorization_NotifyService | EventsNotification::evSubsUri, EventsNotification::evNotifs | PCF | | EventsNotification |
| NsmfPDUSession_NotifyPDUSession | StatusNotification::statusInfo | SMF | SMF | StatusNotification |
| NsmfPDUSession_NotifySMContext | SMContextStatusNotification::statusInfo | SMF | AMF | SMContextStatusNotification |
| NsmfEventExposure_Notify | NsmfEventExposureNotification::notifId, NsmfEventExposureNotification::eventNotifs | SMF | | NsmfEventExposureNotification |

FIG. 2C

SYSTEMS AND METHODS FOR HANDLING NOTIFICATION MESSAGES IN A 5G NETWORK

CROSS-REFERENCE TO RELATED APPLICATION

This application claims the benefit of priority to Indian Provisional Application No. 202241069613, filed Dec. 2, 2022, the entirety of which is incorporated by reference herein.

BACKGROUND

A 5G system architecture may facilitate service-based interaction between control plane network functions. Network functions within the 5GC control plane may use service-based interfaces for their interactions. Such service-based interfaces may utilize an HTTP/2 protocol as an application layer serialization protocol.

5G procedures may have well-defined path indicators for recognizing procedures. Notification application programming interfaces may not follow the same format. Notification messages transmitted over a 5G network may not be identified using the standard path analysis because the format of uniform resource identifiers of such messages may not be standardized.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2B illustrates example entries in a notify database, in accordance with an implementation;

FIG. 2C illustrates example entries in a payload based notification rules database, in accordance with an implementation;

DETAILED DESCRIPTION

Figure 1:
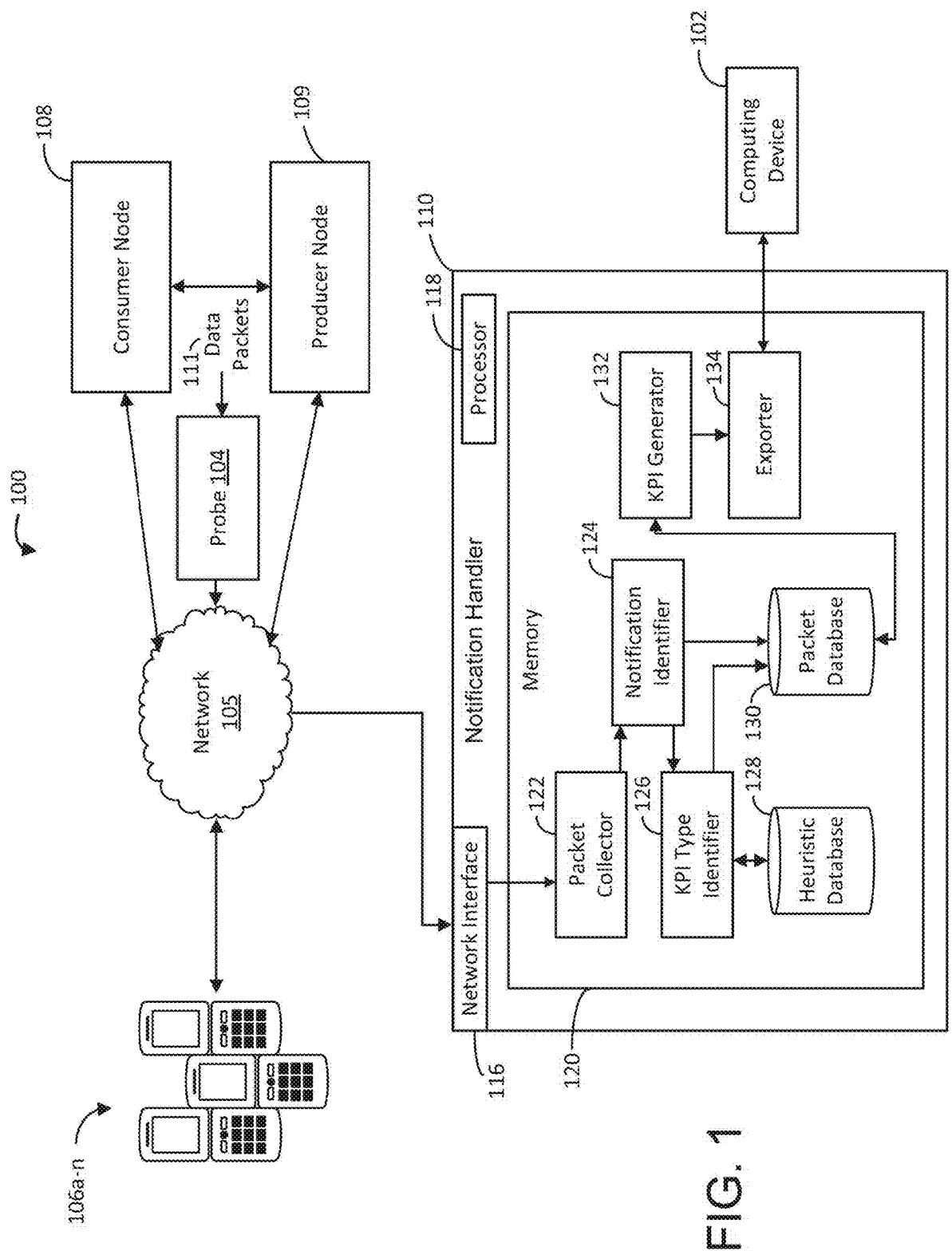
FIG. 1 is an illustration of a system for handling notification messages in a 5G network, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A conventional network monitoring system may have difficulties generating key performance indicators (KPIs) for a 5G communication network when nodes transmit notification messages to each other. For example, a producer node may transmit data packets to a consumer node. The data packets may include data regarding different devices or user equipment (UE) in the payloads of the data packets. The producer node may transmit messages that follow a standard 5G format in the uniform resource identifiers (URIs) of the data packets, as well as notification messages that do not follow the standard 5G format. The network monitoring system may determine which KPIs to generate for data packets based on the URIs in the data packets, which may identify the type of content in the data packets. The network monitoring system may not be able to determine KPIs to generate based on data packets for notifications because the URIs of such notifications may not indicate the type of content in such data packets.

A computer implementing the systems and methods described herein may overcome the aforementioned technical deficiencies. For example, the computer may receive data packets transmitted between a consumer node and a producer node via a probe monitoring a communication session between the nodes. The computer may identify data packets that may correspond to notifications based on whether the URIs of the collected data packets follow a particular format for communications across a 5G network. The computer may identify notification data packets and apply a set of rules to the content of the data packets (e.g., the payload and/or the URI of the data packets). The computer may identify any rules that the content of the notification data packets satisfy. Based on the satisfied rules, the computer may identify KPIs or procedures (e.g., notification procedures) that the computer can implement on the content of the data packets to calculate KPIs. The computer may then calculate KPIs from the notification data packets according to the determined KPIs or procedures that the computer determined for the data packets.

In some implementations, the computer may apply different types of rules to the data packets to identify the KPIs that can be determined from the data packets. For example, the computer may identify the server that corresponds to (or is) the producer node from an internet protocol (IP) address in a data packet. The computer may identify the rules that correspond to the identified server from a database and apply the rules to the content of the data packet. Additionally or instead, the computer may apply a defined set of rules to the content of the data packet that correspond to different subscribers. For example, the computer may collect data packets that indicate particular subscribers from a consumer node. Such data packets may include signatures or values that indicate signatures or templates of values for the producer node to use when transmitting notification data packets to the consumer node regarding the consumers. The computer may apply the set of rules for the subscribers to the notification data packets to determine KPIs that are specific to individual subscribers. Additionally or instead, the computer may apply a user-configurable defined set of rules to determine KPIs that can be calculated from content of data packets. The set of rules may include values that an administrator can set that can indicate types of KPIs for data packets if the values are in notification data packets (e.g., notification messages). The computer may apply one or more of the sets of rules to the notification data packets to determine KPI types that can be determined from the data packets.

FIG. 1 illustrates an example system 100 for handling notification messages in a 5G network, in some embodiments. The system 100 may provide improved network monitoring of a 5G network. In brief overview, the system 100 can include a probe 104 that receives and/or stores data packets transmitted via a network 105 between a consumer node 108 and a producer node 109. Client devices 106a-n (hereinafter client device 106 or client devices 106) can communicate with the consumer node 108 and/or the producer node 109 (together, the nodes 108 and 109) via the network 105. The consumer node 108 and the producer node 109 can include a set of one or more servers 402, depicted in FIG. 4A, or a data center 408. The system 100 can also include a notification handler 110 that can communicate or interface with the probe 104 and/or a client device 102, either directly or via the network 105, to generate KPIs regarding client devices 106 based on data packets the consumer node 108 and the producer node 109 transmit between each other. The notification handler 110 can collect data from the probe 104 and generate KPIs regarding the client devices 106 and the connection between the client devices 106 and the consumer node 108 and/or the producer node 109 over the network 105. The notification handler 110 can display the KPIs at the client device 102.

The probe 104, the client devices 106, the nodes 108 and 109, the client device 102, and/or the notification handler 110 can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. The network 105 can be or include a 5G network. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by one of the nodes 108 or 109 or otherwise communicate with the servers of the nodes 108 or 109. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the client device 102, the probe 104, the client devices 106, the nodes 108 and 109, and/or the notification handler 110 can include or utilize at least one processing unit or other logic device such as programmable logic array engine, or module configured to communicate with one another or other resources or databases. The components of the client device 102, the probe 104, the client devices 106, the nodes 108 and 109, and/or the notification handler 110 can be separate components or a single component. System 100 and its components can include hardware elements, such as one or more processors, logic devices, or circuits.

Still referring to FIG. 1, and in further detail, system 100 can include the consumer node 108 and the producer node 109. The nodes 108 and 109 may each be or include servers or computers configured to transmit or provide services across the network 105 to the client devices 106. The nodes 108 and 109 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc.

The producer node 109 may exchange (e.g., transmit) data packets 111 with the consumer node 108. The data packets 111 may be messages regarding individual client devices 106. For instance, the producer node 109 may provide a service to a client device 106. The consumer node 108 may transmit a data packet 111 to the producer node 109 subscribing to receive data regarding the service the producer node 109 is providing to the client device 106. Based on receiving the subscription in the data packet 111, the producer node 109 may transmit data packets 111 to the consumer node 108 regarding the service to the client device 106. For example, the producer node 109 may provide a location tracking service to a client device 106. In providing the service, the producer node 109 may receive data regarding the location of client device 106 at set intervals or upon querying the client device 106. The producer node 109 may identify the locations and transmit the locations to the consumer node 108 in data packets 111.

Client devices 106 can include or execute applications to receive data from service providers, such as the producer node 109. For example, a client device 106 may execute a video application associated with the producer node upon receiving a user input selection that causes the client device 106 to open the video application on the display. Responsive to executing the video application, the producer node 109 associated with the video application may stream a requested video to the client device 106 in a communication session. In another example, a client device 106 may execute a video game application associated with the producer node 109. Responsive to executing the video game application, the producer node 109 associated with the video game application may provide data for the video game application to the client device 106. The client devices 106 may establish communication sessions with service providers for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 410 depicted in FIG. 4B). If the client device 106 is deployed in a cloud 410, the client device 106 can include or be referred to as a virtual client device or virtual machine. In the event the client device 106 is deployed in a cloud 410, the packets exchanged between the client device 106 and the nodes 108 and 109 can still be retrieved by a probe (e.g., the probe 104 or a different probe) from the network 105. The client device 102 may be similar to client devices 106. In some cases, the probe 104, the client devices 106, and/or the notification handler 110 can be deployed in the cloud 410 on the same computing host in an infrastructure 416 (described below with respect to FIG. 4).

As the nodes 108 and 109 provide or transmit data in communication sessions to client devices 106 and between each other, the probe 104 may intercept or otherwise monitor the control plane signaling data (e.g., control plane signaling data packets) the data packets 111 that nodes 108 and 109 transmit between each other regarding the client devices. The probe 104 may comprise one or more processors that are connected to a network equipment manufacture (NEM) trace port of network 105. In some embodiments, the probe 104 may collect control plane signaling data at an Evolved Packet Core interface (e.g., the S1-MME interface or the S6a interface) of the network 105. The control plane signaling data may include geographical location data (e.g., cell tower triangulation data or global positioning system data) of the client devices 106 as the client devices 106 receive data and/or transmit a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. The probe 104 may receive such data and forward the data to the notification handler 110 over the network 105 for further processing.

The notification handler 110 may comprise one or more processors that are configured to receive control plane signaling data and generate KPI data from the received control plane signaling data. The notification handler 110 may comprise a network interface 116, a processor 118, and/or memory 120. The notification handler 110 may communicate with any of the client device 102, the probe 104, the client devices 106, and/or the nodes 108 and 109 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include a packet collector 122, a notification identifier 124, a KPI type identifier 126, a heuristic database 128, a packet database 130, a KPI generator 132, and an exporter 134, in some embodiments. In brief overview, the components 122-134 may collect data packets transmitted between the nodes 108 and 109. The components 122-134 may identify notification messages from the data packets by identifying data packets that have URIs with formats that do not conform to a particular format (e.g., a 5G specific URI format). The components 122-134 may apply heuristics to the data packets identified as corresponding to notification messages. In doing so, the components may determine KPI types of the notification messages. The components 122-134 may generate KPIs from the notification messages (in some cases in combination with other messages) based on the determined KPI types of the notification messages. In some embodiments, the components 122-134 may transmit the KPIs to the client device 102 in response to a request from the client device 102.

The packet collector 122 may comprise programmable instructions that, upon execution, cause the processor 118 to receive or collect data (e.g., control plane signaling data packets) from the probe 104. The packet collector 122 may collect control plane signaling data from the probe 104. The packet collector 122 may collect data by polling or receiving data from the probe 104. The packet collector 122 may poll or receive data from the probe 104 at set intervals or pseudo-randomly. Upon receiving such data, the packet collector 122 may transmit the data to the notification identifier 124.

The packet collector 122 may store data packets and/or content of the data packets in memory (e.g., the memory 120). In some embodiments, the packet collector 122 stores the data packets in the packet database 130. The packet database 130 may be a database (e.g., a relational database) that stores data packets and/or values the packet collector 122 extracted from the data packets. The packet collector 122 may extract all data or specific data (e.g., data the packet collector 122 identifies in the data packets according to a set of rules) from each data packet and store the extracted data in the packet database 130. In some embodiments, the packet collector 122 stores the entire data packets in the packet database 130. The packet collector 122 may store such data packets for data regarding different client devices 106. In doing so, the packet collector 122 may store identifiers (e.g., strings) of the client devices 106 in communication sessions with service providers, such as the nodes 108 and 109, with the respective data packets and/or for the communication sessions themselves. In some embodiments, the packet collector 122 may store the data packets and/or data extracted from the data packets in the memory 120 instead of the packet database 130. The KPI generator 132 may retrieve the data packets and/or the data extracted from the data packets from the packet database 130 and/or the memory 120. The KPI generator 132 may do so to generate KPIs and/or alerts from the data on a per communication session or device (e.g., based on the stored identifiers associated with the communications and/or devices in the data) basis and/or based on an aggregation of data across multiple communication sessions.

The notification identifier 124 may comprise programmable instructions that, upon execution, cause the processor 118 to determine whether data packets collected through the probe 104 are notification messages. The notification identifier 124 may determine which messages are notifications based on the values and/or formats of the URIs in the data packets. For example, a URI of a data packet transmitted over a 5G mobile network communication protocol using a 3GPP defined fixed URI structure may have the format or value template of:

{apiRoot}/<apiName>/<apiVersion>/<apiSpecificResourceUriPart>, or {apiRoot}/{apiName}/{apiVersion}/{apiSpecificResourceUriPart}/{custOpName} where apiName defines the name of the application programming interface (API) that is transmitting the messages. The apiName may be a 3GPP defined field and may have a fixed name for each service API (e.g., npcf-am-policy-control for Npcf AMPolicyControl API). The notification handler 110 may determine the notification procedure or the KPI type for which to generate data based on the values for apiSpecificResourceUriPart and/or the apiName in the URI. The notification identifier 124 may determine a data packet is not a notification message based on the values and/or format in the URI of the data packet matching value template of the fixed URI structure. The notification identifier 124 can compare the values in the URI of the data packet to the value template. For instance, the notification identifier 124 can identify the field types of the values in the URI and compare the field types to the value template. Responsive to the values (e.g., field types) of the URI matching the value template, the notification identifier 124 may determine the data packet is not a notification message. However, responsive to the values of the URI not matching the value template, the notification identifier 124 may determine the data packet is a notification message.

The notification handler 110 may not be able to determine a notification procedure or type of KPI that can be generated from notification data packets from values in the URIs of such data packets. For example, notification messages may follow the following URI format:

URI=scheme ":" "//" host [":" port]/path where path defines a path for an NF consumer resource. Because the URI for notification messages may not include apiName and/or API Specific Resource URI, the notification handler 110 may not be able to determine a notification procedure or type of KPI that can be generated from the data packet from the individual values in the URI.

In some implementations, the notification identifier 124 can identify the producer node 108 and/or the consumer node 109 that receives or transmits the data packets 111. The notification identifier 124 may do so based on values in internet protocol (IP) addresses of the data packets 111. For example, the notification identifier 124 can identify the IP addresses of the source and destination for a data packet the packet collector 122 collects from the probe 104. The notification identifier 124 can compare values in the IP addresses (e.g., the IP addresses themselves) to values in a database. The values in the database may correspond to identifiers of specific servers and/or nodes that are connected to the network 105. The notification identifier 124. The notification identifier 124 may identify values in the database that match the values from the IP addresses from the data packet. Based on the identification, the notification identifier 124 may identify identifiers of the producer node 108 and/or the consumer node 109 that correspond to identified values. The KPI type identifier 126 may use such identifiers to determine a KPI type for the data packet.

The KPI type identifier 126 may comprise programmable instructions that, upon execution, cause the processor 118 to determine KPI types of data packets transmitted between nodes of a network (e.g., a 5G network). The KPI type identifier 126 may be configured to use heuristics (e.g., KPI type determination rules) stored in the heuristic database 128 to determine KPI types (e.g., notification procedures to determine specific KPI types) of data packets. Heuristics may be a set of rules and/or templates that correspond to different KPI types. The KPI type identifier 126 may compare the heuristics to the content (e.g., payload and/or URI) of the data packets to determine if values in the content satisfy any of the heuristics. Responsive to identifying a satisfied heuristic based on the comparison, the KPI type identifier 126 may identify the KPI type that corresponds to the satisfied heuristic in the heuristic database. The KPI type identifier 126 may determine the identified KPI type is the KPI type of the data packet.

In some embodiments, the KPI type identifier 126 may determine a type of notification from the satisfied heuristic. For example, the KPI type identifier 126 may identify a type of notification that is associated with a satisfied heuristic in the heuristic database 128. The KPI type identifier 126 may store an indicator of a type of notification message with the data packet from which the type of notification was determined. The type of notification may correspond to a type of KPI. The type of notification message may be used to determine a KPI. Accordingly, by determining the type of notification, the KPI type identifier 126 may determine a type of KPI for the notification message.

The heuristic database 128 may be or include one or more databases (e.g., relational databases) that each include one or more heuristics (e.g., rules). The heuristic database 128 can store different types of heuristics. Heuristics may include values, strings, value formats, or value format sequences that may be included in payloads and/or URIs of data packets. Individual heuristics may include values, strings, value formats, or value format sequences (e.g., signatures) specifically for payloads, specifically for URIs or for a combination of payloads and URIs.

For example, the heuristic database 128 may store heuristics that are specific to individual producer nodes and consumer nodes. Such heuristics may be stored with associations with identifiers of the respective producer nodes and/or consumer nodes. The heuristic database 128 may store static heuristics. Static heuristics may be input by an administrator (e.g., a user interface presented on a client device). The administrator may update the heuristics in the heuristic database 128 by providing an input into the user interface presented on the client device. The heuristic database 128 may store dynamic heuristics. Dynamic heuristics may be heuristics that the notification handler 110 adds to the heuristic database 128 over time. Such dynamic heuristics may correspond to signatures or specific values or value formats for individual subscribers to services provided by the provider and/or consumer nodes.

Each heuristic may correspond to a specific notification protocol or KPI type in the database. The KPI type identifier 126 may determine a heuristic that is satisfied in the heuristic database 128 by comparing a string (e.g., a string of values) in the payload and/or the URI to the heuristics in the heuristic database 128. Responsive to determining the heuristic is satisfied, the KPI type identifier 126 may identify the KPI type or notification procedure from the heuristic database that corresponds to the satisfied heuristic. Accordingly, the KPI type identifier 126 may use heuristics from the heuristic database 128 to determine KPI types or notification procedures for different notification data packets.

Upon determining the KPI type of a notification data packet, the KPI type identifier 126 may store an association between the KPI type and the data packet or data from the data packet and the determined KPI type in the packet database 130. The KPI type identifier 126 may identify the data packet in memory or store the data packet or data from the data packet in the packet database 130. The KPI type identifier 126 may store an association between the determined KPI type and the data packet or data from the data packet in the packet database 130. Accordingly, the data from the data packet may be used to generate KPIs. The KPI type identifier 126 may similarly determine KPI types for any number of data packets the packet collector 122 collects from probes such as the probe 104.

The KPI generator 132 may comprise programmable instructions that, upon execution, cause the processor 118 to generate KPIs and/or alerts from data (e.g., the payloads and/or headers) of the data packets. Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The KPI generator 132 may generate the KPIs or alerts for individual communication sessions, geographical areas in which individual nodes that are communicating and receiving data across the network 105 are located, types of devices, etc.

The KPI generator 132 may generate the KPIs or alerts based on data packets stored in the packet database 130. For example, the KPI generator 132 may retrieve data packets and/or data from the data packets from the packet database 130. The KPI generator 132 may identify the KPI types or the notification procedures from the packet database 130. The KPI generator 132 may then extract or determine data from the payloads and/or headers of the data packets or data from the data packet according to the corresponding KPI types or notification procedures. The KPI generator 132 may use the extracted or determined data to generate KPIs indicating the performance of the network 105.

The exporter 134 may be or comprise executable instructions that, upon execution by the processor 118, may export generated KPIs or alerts and/or corresponding data to the client device 102. For example, the exporter 134 may create an exportable file (e.g., a file with a format such as BIL, GRD/TAB, PNG, ASKII, KMZ, etc.) from the generated KPIs and transmit the exportable file to the client device 102 for display. The exporter 134 may transmit the exportable file to the client device 102, in some cases responsive to a request from the client device 102. In some embodiments, the KPI generator 132 and/or the exporter 134 may generate and/or export KPIs to the client device 102 at set intervals to provide the client device 102 with real-time updates of the performance communication sessions between nodes.

In some embodiments, the exporter 134 may export KPIs that the KPI generator 132 generates based on the data packets. The exporter 134 may encapsulate the KPIs into data packets and transmit the data packets to the client device 102 for processing (e.g., for display at a user interface). In some embodiments, the exporter 134 encapsulates and/or transmits the data packets or data from the data packets to the client device 102 without generating KPIs from the data packets or data. In such embodiments, the client device 102 may display the data and/or generate the KPIs itself.

Figure 2A:
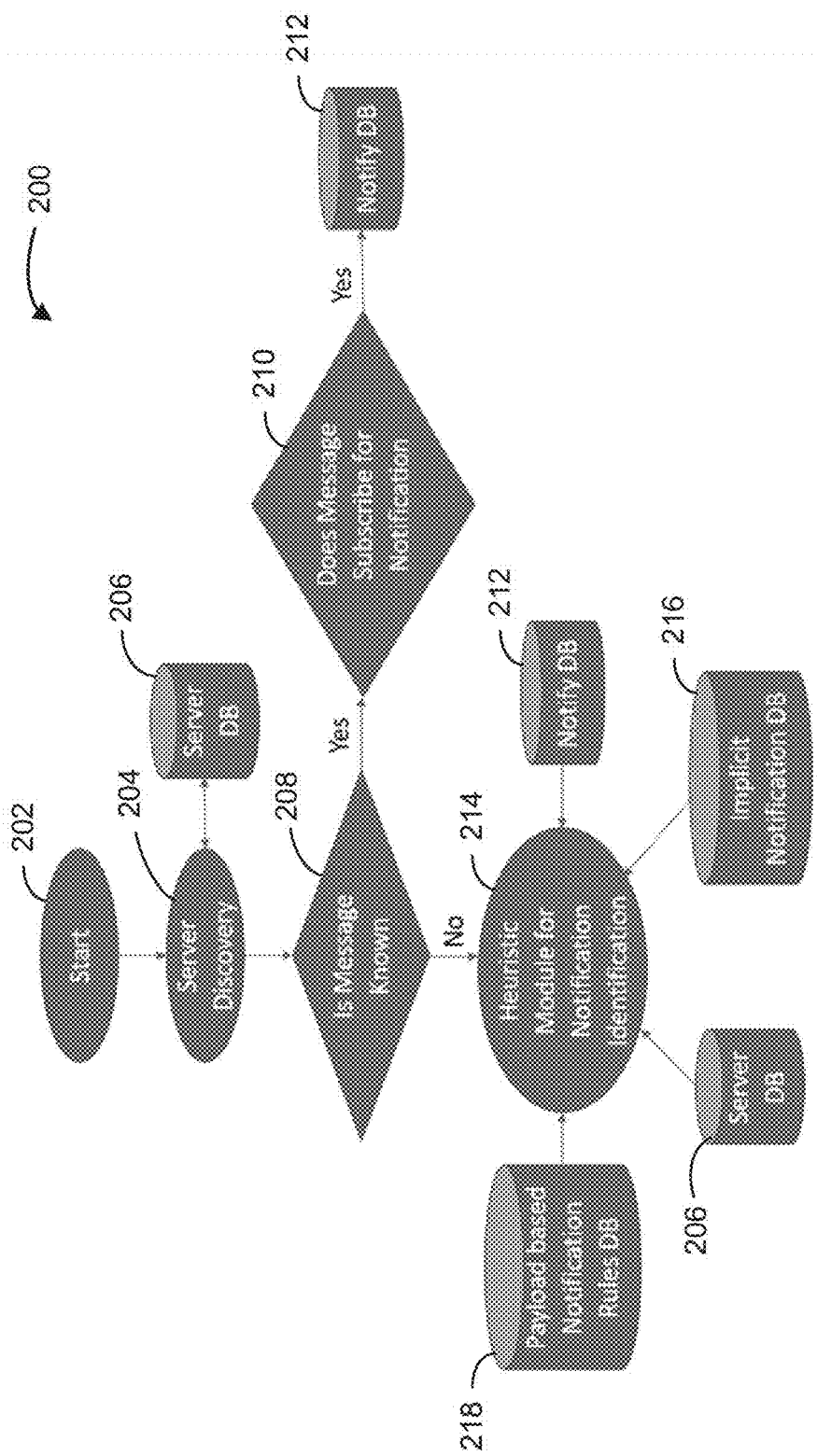
FIG. 2A is a flow diagram of a process for handling notification messages in a 5G network, in accordance with an implementation.

FIG. 2 is a flow diagram of a process for handling notification messages in a 5G network, in accordance with an implementation. The process 200 can be performed by a data processing system (a client device, a probe, the notification handler 110, shown and described with reference to FIG. 1, a server system, etc.). The process 200 may include more or fewer operations and the operations may be performed in any order.

At operation 202, a probe (e.g., the probe 104) may start. The probe may start or begin collecting data packets or copies of data packets transmitted between nodes (e.g., two nodes). The nodes may include a producer node and a consumer node. The probe may collect data packets that correspond to notifications from producer nodes to consumer nodes or data packets that follow a standard 3GPP format.

At operation 204, the data processing system can identify identifiers of servers or computing devices of a source and/or a destination of a data packet collected by the probe. The data processing system can identify the identifiers based on one or more values in the IP addresses of the data packet. For example, the data processing system may identify one or more values in each of the IP addresses and compare the one or more values to data in a server database 206.

The server database 206 may be a database (e.g., a relational database) that contains identifiers of servers or computing devices that correspond to values the data processing system can retrieve from IP addresses in data packets. The data processing system can identify values in the server database 206 that match the values the data processing system extracted from the IP addresses. The data processing system can identify identifiers of servers or computing devices that correspond to the values in the database. Based on the identification, the data processing system can identify the producer and/or consumer nodes (e.g., producer and consumer service APIs) that are communicating through the data packet.

At operation 208, the data processing system determines whether the data packet is known (e.g., whether the data processing system knows the procedure to apply to the data packet). The data processing system may determine if the data packet is known by comparing the URI of the data packet with a value template (e.g., a value template indicating a standard URI format and values of a 3GPP protocol). The data processing system may determine the data packet is known responsive to determining the URI matches the value template and determine the data packet is not known responsive to determining the URI does not match the value template.

Responsive to determining the data packet is known, at operation 210, the data processing system may determine whether the data packet is a subscription to receive notifications. A subscription for notifications may be a subscription for a consumer node to receive notification messages regarding a particular subscriber from the producer node. The data processing system may determine whether the data packet is a subscription to receive notifications based on one or more values in the URI of the data packet. The data processing system may determine whether a defined value is in the URI and whether the data packet is a subscription for notifications based on whether the URI contains the defined value.

Responsive to identifying the defined value in the URI of the data packet, the data processing system may update a notify database 212 with a new entry for the subscription. The notify database 212 may be a database (e.g., a relational database) that maintains entries for notification message subscriptions by producer nodes. The notify database 212 may be queried to identify a path for a data packet. An example of entries in the notify database 212 is illustrated in FIG. 2B. The data processing system may add new entries to the beginning of the notify database 212 as the data processing system determines new subscription data packets. Each entry in the notify database 212 may include a signature (e.g., a value or set of values) for the subscription. The data processing system may insert the entries into the database based on or from data in the payloads and/or URIs of the subscription messages. The data processing system may retrieve the signatures from the notify database 212. The data processing may compare the signatures to URIs and/or payloads of data packets that the data processing system determined to be notification messages. In doing so, the data processing system may determine whether the data packets are notifications for the particular subscriptions, and thus the notification procedures or KPI types for the data packets, based on whether the values of the URIs or the payloads match any of the signatures in the notify database.

For example, a subscription may be a subscription to generate and maintain a record of locations of a client device. The data processing system may insert an entry into the notify database 212 indicating the subscription is to maintain a record of locations of the client device. The record may include an identification of the client device. The data processing system may compare a signature for the entry to the values of a URI or a payload of a data packet. Responsive to identifying a match, the data processing system may determine the KPI type or notification procedure for the data packet relates to a location of the client device (e.g., the data that is contained in the data packet contains location data of the client device).

Responsive to determining the data packet is not known (e.g., is a notification message) at operation 208, at operation 214, the data processing system may execute a heuristic module (e.g., the KPI type identifier 126, shown and described with reference to FIG. 1). Executing the heuristic module may cause the data processing system to apply heuristics to the values in the URI and/or the payload of the data packet. The data processing system may retrieve heuristics from the server database 206, the notify database 212, an implicit notification database 216, and/or a payload based notification rules database 218. The data processing system may apply the heuristics to the content of the data packet. Responsive to identifying a heuristic that is satisfied, the data processing system may identify a KPI type that corresponds to the heuristic. The data processing system may store an identification of the KPI type with the data packet or data from the data packet in memory (e.g., in the packet database 130).

The implicit notification database 216 may be a configurable database (e.g., a relational database). The implicit notification database 216 may contain entries (e.g., heuristics) for notification URIs (e.g., KPI types or notification procedures of URIs) that remain consistent over a long time period. The entries may contain notifications at Network Function level. The entries may include value templates specific to URIs (e.g., that can only be satisfied based on values of URIs). URIs of notification data packets may be compared to entries in the implicit notification database 216 to determine KPI types for the notification data packets.

The payload-based notification rules database 218 may be a static database (e.g., a relational database) that contains heuristics for identifying KPI types that are input by an administrator. An example of entries in the payload-based notification rules database 218 is illustrated in FIG. 2C. The payload based notification rules database 218 may include a JSON objects matching schema. For example, the data processing system may query the content of the data packet for elements of a JSON message in an entry of the payload based notification rules database 218. Responsive to identifying each element of a JSON message in an entry in the payload based notification rules database 218 in the data packet, the data processing system may identify the notification procedure or KPI type that corresponds to the matching JSON message (e.g., satisfied heuristic).

In some cases, the data processing system may identify a producer and/or consumer types (e.g., access and mobility management function (AMF)/unified data management (UDM)/policy control function (PCF)/session management function (SMF)) responsive to identifying the JSON message that is satisfied. The data processing system may identify a producer type and/or a consumer type and then identify payload strings (e.g., signatures) that correspond to the identified producer type and/or consumer type. The data processing system may compare the identified payload strings to the payload in the data packet. Upon determining a match, the data processing system may determine a heuristic associated with the payload string is satisfied.

By executing the heuristics module at operation 214, the data processing system may retrieve heuristics or entries from each or a subset of the server database 206, the notify database 212, the implicit notification database 216, and/or the payload based notification rules database 218. The data processing system may compare the retrieved heuristics or entries and compare the values of the content of the data packet to the heuristics. Responsive to identifying a satisfied heuristic, the data processing system may identify a KPI type that corresponds to the satisfied heuristic. The data processing system may then use the data from the data packet to determine a KPI according to the KPI type.

Figure 3:
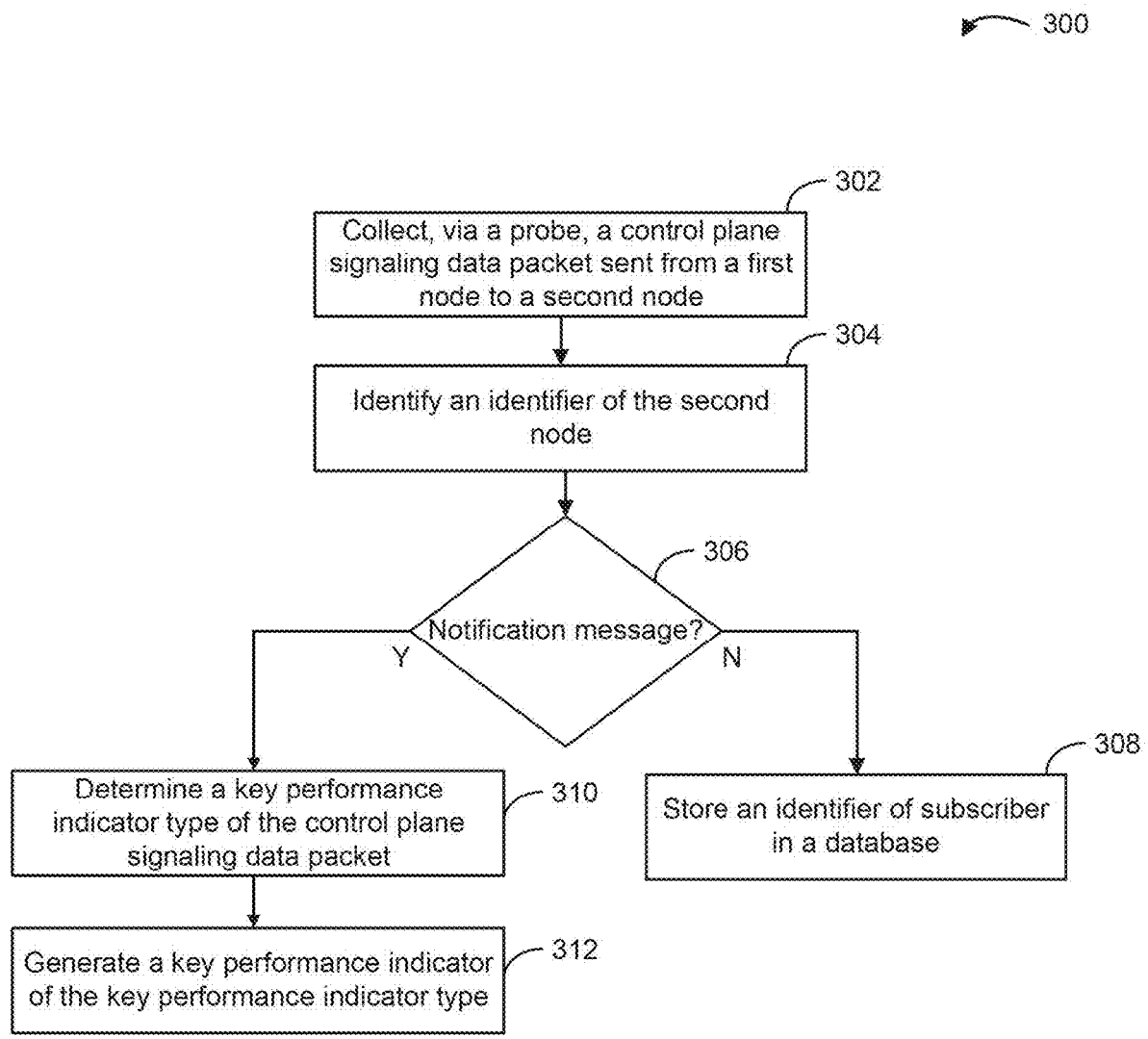
FIG. 3 is an illustration of a method for handling notification messages in a 5G network, in accordance with an implementation.

FIG. 3 is an illustration of a method 300 for handling notification messages in a 5G network, in accordance with an implementation. The method 300 can be performed by a data processing system (e.g., a client device, a probe, the notification handler 110, shown and described with reference to FIG. 1, a server system, etc.). The method 300 may include more or fewer operations and the operations may be performed in any order. Performance of the method 300 may enable the data processing system to analyze notification data packets that are transmitted between nodes (e.g., transmitted between producer nodes and consumer nodes). Notification data packets may be notification messages as described herein. The data processing system may identify notification data packets from data packets that follow the standard 3GPP protocol. The data processing system may apply heuristics to content of the identified notification data packets. The data processing system may identify a heuristic that is satisfied by the content of a data packet. The data processing system may determine a KPI type that corresponds to the satisfied heuristic. The data processing system may generate a KPI of the determined KPI type based on data of the notification data packet. Thus, by implementing the methods described herein, the data processing system may determine KPIs from content of notification messages of a 5G communications network.

At operation 302, the data processing system collects control plane signaling data (e.g., data packets). Control plane signaling data may include data packets that include data that is transmitted across a network between nodes of a 5G. The control plane signaling data may include data packets between consumer nodes and producer nodes. For example, the control plane signaling data may include subscriptions by consumer nodes for notifications from the producer nodes. The subscriptions may be to receive notifications from specific subscribers (e.g., UE). The control plane signaling data may include notification messages to the consumer nodes per the subscriptions. The control plane signaling data may additionally include data packets transmitted using the standard 3GPP protocol format.

The data processing system may collect the control plane signaling data from a control signaling data probe that is configured to receive or collect the control plane signaling data. Such a control signaling probe may collect the control plane signaling data from a network equipment manufacturer (NEM) trace port. In some embodiments, the control signaling probe may collect control plane signaling data at an Evolved Packet Core interface (e.g., the S1-MME interface or the S6a interface) of the network.

The data processing system may receive a data packet transmitted by a first node to a second node. The first node may be a producer node and the second node may be a consumer node. The data processing system may receive the data packet from the control signaling probe.

At operation 304, the data processing system may identify an identifier of the second node. The data processing system may identify the identifier of the second node based on a value in an IP address of the data packet. For example, the data processing system may extract one or more values from the IP address for the destination of the data packet. The data processing system may compare the extracted one or more values to a database that includes values that may be included in IP addresses of nodes as well as identifiers for the nodes that correspond to the one or more values. The data processing system may compare the extracted values from the IP address of the data packet to the one or more values. The data processing system may identify a matching one or more values in the database based on the comparison. The data processing system may identify an identifier that corresponds to the matching one or more values. The identifier may be an identifier of the second node. In some implementations, the data processing system may similarly identify an identifier of the first node based on an IP address for the source of the data packet.

At operation 306, the data processing system determines whether the data packet is a notification data packet (e.g., a data packet of a notification message). The data processing system may determine whether the data packet is a notification data packet by comparing a URI to a value template. The value template may be a set of values or value types and/or an order for such values or value types. The value template may be for a 5G mobile network communication protocol. The data processing system may compare the URI of the data packet to the value template and determine if the values of the URI match the value template. The data processing system may determine the data packet is a notification message based on whether the values of the URI match the value template. The data processing system may determine the data processing system is not a notification message responsive to determining the values of the URI match the value template. The data processing system may determine the data packet is a notification message responsive to determining the values of the URI do not match the value template.

Responsive to determining the data packet is not a notification message, the data processing system may determine whether the data packet is for a subscription to receive notifications regarding a subscriber. The data processing system may do so by identifying one or more values in the URI of the data packet. Responsive to determining the data packet is a subscription to receive notifications regarding a subscriber, at operation 308, the data processing system may store a record of the subscription in a database with a signature (e.g., one or more values) that the data processing system can use to determine a KPI type of data packets that include the signature in the content of the data packets. The record may include an identifier of the subscriber. Responsive to determining the data packet is not a subscription, the data processing system may store the data packet or data from the data packet in a database. The stored data packet and/or data may be used to determine a KPI based on the URI in the data packet.

Responsive to determining the data packet is a notification message at operation 308, the data processing system determines a key performance indicator type of the data packet. The data processing system may do so by comparing the content (e.g., values in the payload or values in the URI of the data packet) of the data packet to heuristics stored in a database. Examples of such heuristics include signatures the data processing system generates for individual subscriptions, heuristics the data processing system identifies based on one or both of the identifiers the data processing system generates based on the identifiers of the first and second nodes, static heuristics, or any other heuristics the data processing system has stored in memory. The data processing system may identify a heuristic that is satisfied based on the content of the data packet. The data processing system may identify a KPI type that corresponds to the satisfied heuristic. The data processing system may store an association between the KPI type and the data packet or data from the data packet in memory.

At operation 312, the data processing system may generate a KPI. The data processing system may generate the KPI using data from the data packet. The data processing system may generate the KPI of the KPI type. In doing so, the data processing system may identify the KPI type for data of the data packet and determine a KPI of the KPI type based on the data of the data packet. In this way, the data processing system may determine KPIs based on notification messages despite the notification messages not including any indicator of the type of data that is in the payloads of the notification messages.

Figure 4A:
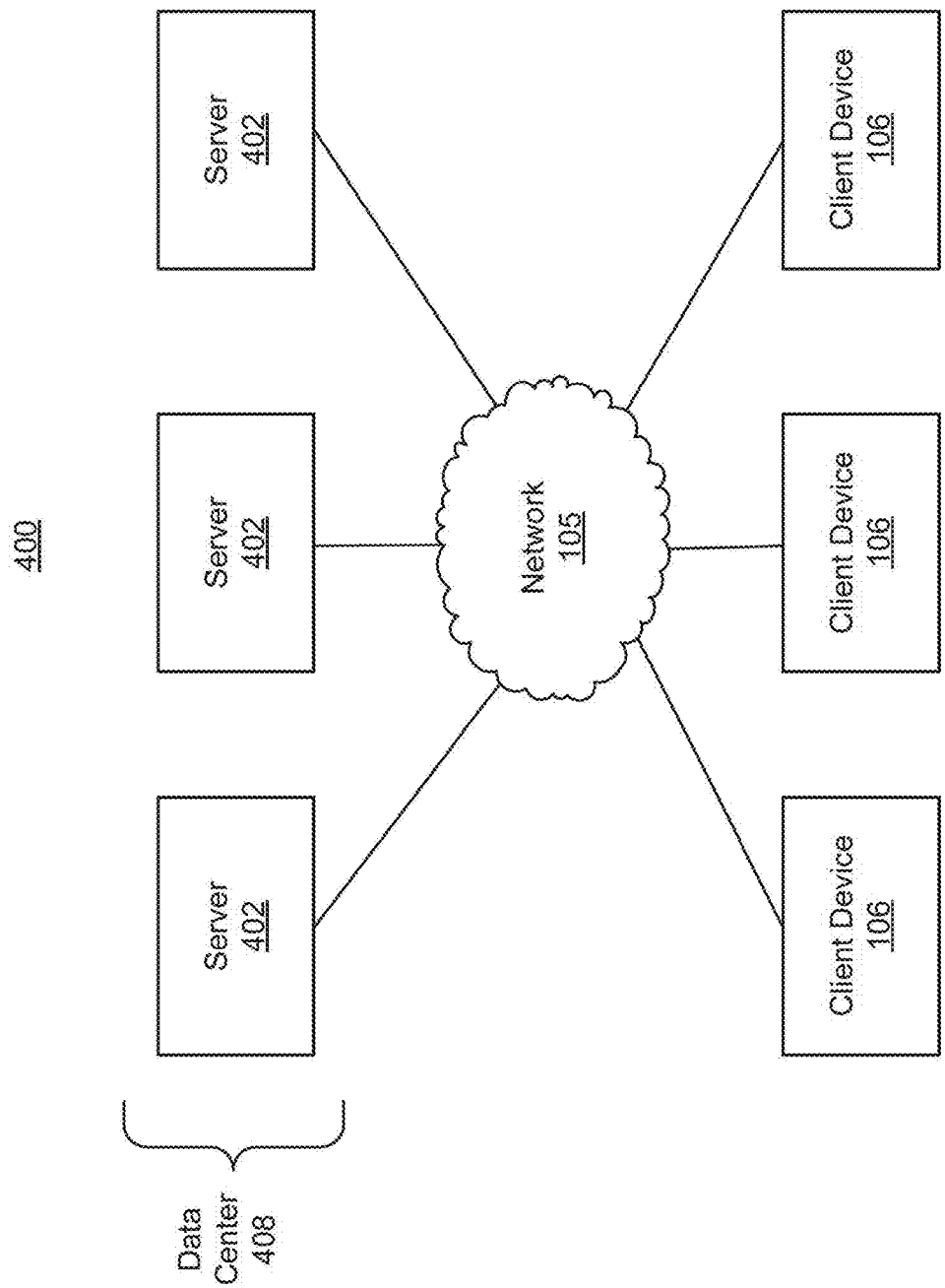
FIG. 4A is a block diagram depicting an implementation of a network environment including a client device in communication with a server device.

FIG. 4A depicts an example network environment that can be used in connection with the methods and systems described herein. In brief overview, the network environment 400 includes one or more client devices 106 (also generally referred to as clients, client node, client machines, client computers, client computing devices, endpoints, or endpoint nodes) in communication with one or more servers 402 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 4A shows a network 105 between the client devices 106 and the servers 402, the client devices 106 and the servers 402 can be on the same network 105. In embodiments, there are multiple networks 105 between the client devices 106 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPV6), or the link layer. The network 105 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
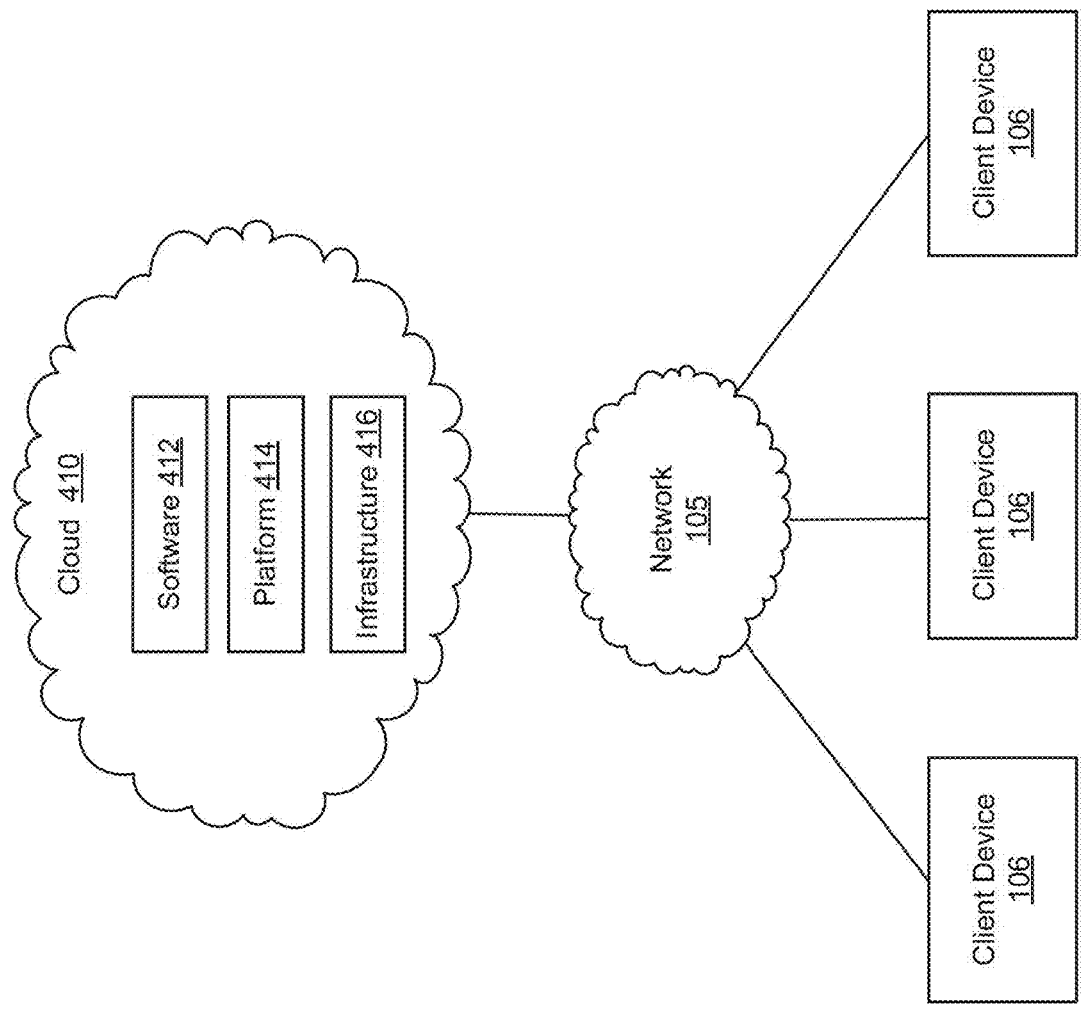
FIG. 4B is a block diagram depicting a cloud computing environment including a client device in communication with cloud service providers.

FIG. 4B illustrates an example cloud computing environment. A cloud computing environment 401 can provide client 106 with one or more resources provided by a network environment. The cloud computing environment 401 can include one or more client devices 106, in communication with the cloud 410 over one or more networks 105. Client devices 106 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back end platforms, e.g., servers 402, storage, server farms or data centers.

The cloud 410 can be public, private, or hybrid. Public clouds can include public servers 402 that are maintained by third parties to the client devices 106 or the owners of the clients. The servers 402 can be located off-site in remote geographical locations as disclosed above or otherwise. Public clouds can be connected to the servers 402 over a public network. Private clouds can include private servers 402 that are physically maintained by client devices 106 or owners of clients. Private clouds can be connected to the servers 402 over a private network 105. Hybrid clouds 408 can include both the private and public networks 105 and servers 402.

The cloud 410 can also include a cloud-based delivery, e.g. Software as a Service (SaaS) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 402 can be deployed as and/or executed on any type and form of computing device, e.g., a computer, network device or appliance capable of communicating on any type and form of network and performing the operations described herein.

Figure 4C:
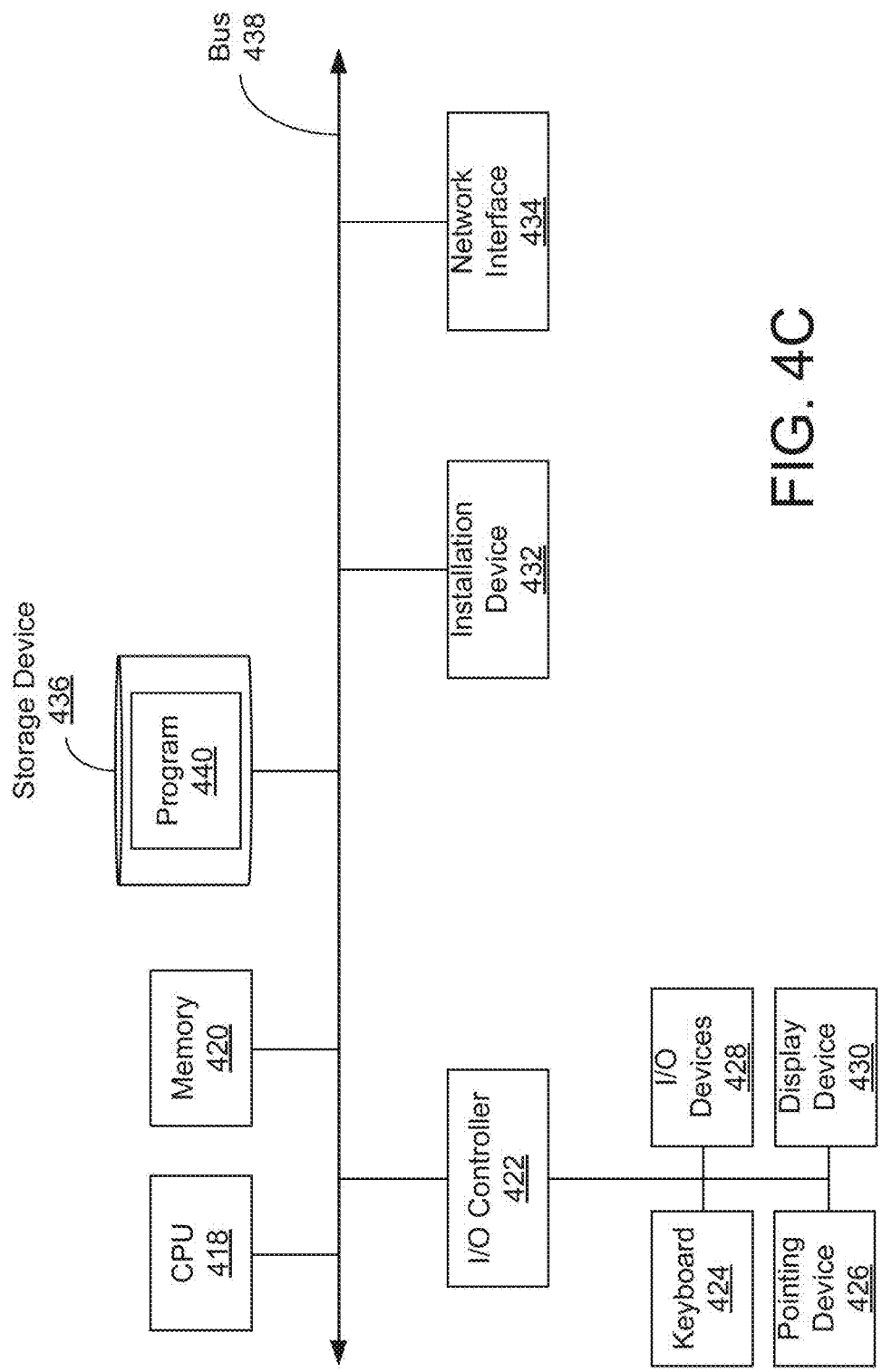
FIG. 4C is a block diagram depicting an implementation of a computing device that can be used in connection with the systems depicted in FIGS. 1, 4A and 4B and the method depicted in FIG. 3.

FIG. 4C depicts block diagrams of a computing device 403 useful for practicing an embodiment of the client 106 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g. a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, 2, or 3. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 106 may not require a non-volatile storage device 436 and can be thin clients or zero client devices 106. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 403 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 106, 402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may implement a probe to collect data packets that are transmitted across communication sessions. The probe may only collect the data packets (or copies of the data packets) and may not directly communicate or transmit messages in data packets to the nodes of the communication sessions. A computer of the network monitoring system may generate key performance indicators (KPIs) from the data packets collected by the probe. The computer may maintain and update a dynamic table and static table for a communication session to be synchronous with the tables maintained and updated by the nodes of the communication session. Accordingly, the computer may use the updated dynamic table to accurately parse the data and/or contents of the data packets to generate KPIs based on the data and/or content of the data packets.

The probe may experience an event (e.g., a shutdown or a reboot) while monitoring a communication session between the nodes. The event may cause a temporary inability of the probe to collect data packets from the communication session. Because the probe is not actively communicating with the two nodes, however, the two nodes may continue transmitting data packets between each other, updating their respective dynamic tables for the communication session in the process. When the probe becomes live, powered on, and/or active and begins collecting data packets from the communication session again, the dynamic table stored by the computer of the network monitoring system may no longer be synchronous with the dynamic tables of the nodes. Accordingly, the computer may not be able to accurately parse the data in the data packets of the communication session.

A computer implementing the systems and methods described herein may overcome the aforementioned technical deficiencies. Upon detecting the event and receiving data packets from the probe again, the computer may operate to reorganize the table according to new data packets the computer receives from the communication session. To do so, the computer may use heuristics to analyze the content (e.g., the payloads and/or other field values) of the data packets to identify the header field values for index values in the data packets. The computer may update the dynamic table for the communication session based on the determined header field values and the index values that correspond to the header field values. The computer may update the dynamic table by adding the new header field values to the dynamic table. The computer may decompress the header field values using the reorganized or updated table to generate KPIs.

At least one aspect of this technical solution is directed to a method. The method may include collecting, by one or more processors via a probe from a communication channel between a first node and a second node, a control plane signaling data packet comprising a uniform resource identifier and transmitted by the first node to the second node; identifying, by the one or more processors, an identifier of the second node based on an internet protocol address in the control plane signaling data packet; determining, by the one or more processors, whether the control plane signaling data packet is a notification message based on a comparison between the uniform resource identifier and a value template; responsive to determining the control plane signaling data packet is a notification message, determining, by the one or more processors, a key performance indicator (KPI) type of the control plane signaling data packet by comparing one or more values of content of the control plane signaling data packet with one or more KPI type determination rules corresponding to the identifier of the second node; and generating, by the one or more processors, a KPI of the determined KPI type based on content of the control plane signaling data packet.

At least one aspect of this technical solution is directed to a system. The system may include one or more processors, coupled to memory. The one or more processors may collect, via a probe from a communication channel between a first node and a second node, a control plane signaling data packet comprising a uniform resource identifier and transmitted by the first node to the second node; identify an identifier of the second node based on an internet protocol address in the in the control plane signaling data packet; determine whether the control plane signaling data packet is a notification message based on a comparison between the uniform resource identifier and a value template; responsive to determining the control plane signaling data packet is a notification message, determine a key performance indicator (KPI) type of the control plane signaling data packet by comparing one or more values of content of the control plane signaling data packet with one or more KPI type determination rules; and generate a KPI of the determined KPI type based on content of the control plane signaling data packet.

At least one aspect of this technical solution is directed to a method. The method may include collecting, by one or more processors via a probe from a communication channel between a first node and a second node, a control plane signaling data packet comprising a uniform resource identifier and transmitted by the first node to the second node; determining, by the one or more processors, whether the control plane signaling data packet is a notification message based on a comparison between the uniform resource identifier and a value template; responsive to determining the control plane signaling data packet is a notification message, determining, by the one or more processors, a key performance indicator (KPI) type of the control plane signaling data packet by comparing one or more values of content of the control plane signaling data packet with one or more KPI type determination rules; and generating, by the one or more processors, a KPI of the determined KPI type based on content of the control plane signaling data packet.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the notification handler 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
collecting, by one or more processors via a probe from a communication channel between a first node and a second node, a control plane signaling data packet comprising a uniform resource identifier and transmitted by the first node to the second node;
identifying, by the one or more processors, an identifier of the second node based on a value in an internet protocol (IP) address in the control plane signaling data packet;
determining, by the one or more processors, whether the control plane signaling data packet is a notification message based on a comparison between the uniform resource identifier and a value template, wherein the value template comprises a node-specific URI template predefined for the second node, the node-specific URI template including a parameter derived from the identifier of the second node;
responsive to determining the control plane signaling data packet is a notification message, determining, by the one or more processors, a key performance indicator (KPI) type of the control plane signaling data packet by comparing one or more values of content of the control plane signaling data packet with one or more KPI type determination rules corresponding to the identifier of the second node; and
generating, by the one or more processors, a KPI of the determined KPI type based on content of the control plane signaling data packet.

2. The method of claim 1, wherein identifying the identifier of the second node comprises:
comparing, by the one or more processors, the value with stored values corresponding to node identifiers in a database; and
identifying, by the one or more processors, the identifier of the second node based on the value matching a stored value corresponding to the identifier of the second node in the database.

3. The method of claim 1, wherein determining whether the control plane signaling data packet is a notification message comprises:
identifying, by the one or more processors, field types of the one or more values of the uniform resource identifier;
comparing, by the one or more processors, the field types to the value template comprising a set of field types; and
determining, by the one or more processors, whether the field types of the one or more values of the uniform resource identifier match the set of field types.

4. The method of claim 3, wherein the identifier of the second node is extracted directly from the IP address in the control plane signaling data packet without querying an external subscriber database.

5. The method of claim 1, wherein determining the KPI type of the control plane signaling data packet comprises:
retrieving, by the one or more processors, the one or more KPI type determination rules from a database based on the identifier of the second node;
comparing, by the one or more processors, the one or more values of the uniform resource identifier of the control plane signaling data packet with the one or more KPI type determination rules; and
determining, by the one or more processors and based on the comparison between the one or more values of the uniform resource identifier with the one or more KPI type determination rules, the one or more values match a KPI type determination rule corresponding to the KPI type.

6. The method of claim 5, wherein comparing the one or more values of the uniform resource identifier of the control plane signaling data packet with the one or more KPI type determination rules comprises determining, by the one or more processors, whether a string of at least one of the one or more values is identical to a string of the one or more KPI type determination rules.

7. The method of claim 1, comprising:
collecting, by the one or more processors via the probe from the communication channel between the first node and the second node, a second control plane signaling data packet comprising a second uniform resource identifier and transmitted by the second node to the first node;
determining, by the one or more processors, the second control plane signaling data packet is not a notification message by determining values of the second uniform resource identifier match the value template;
determining, by the one or more processors, the second control plane signaling data packet is a subscription message;
responsive to determining the second control plane signaling data packet is a subscription message, identifying, by the one or more processors, an identifier of a subscriber in a payload of the second control plane signaling data packet; and
storing, by the one or more processors, the identifier of the subscriber with a signature in a database.

8. The method of claim 7, comprising:
collecting, by the one or more processors via the probe from the communication channel between the first node and the second node, a third control plane signaling data packet comprising a third uniform resource identifier and transmitted by the first node to the second node;
determining, by the one or more processors, the third control plane signaling data packet is a notification message by determining values of the third uniform resource identifier do not match the value template;
retrieving, by the one or more processors, the signature from the database; and
determining, by the one or more processors, a KPI type for the third control plane signaling data packet based on content of the third control plane signaling data packet matching the signature.

9. The method of claim 1, wherein determining whether the control plane signaling data packet is a notification message comprises determining, by the one or more processors, whether the uniform resource identifier comprises each of an application programming interface (API) name, an API version, and an API specific resource uniform resource part.

10. The method of claim 9, wherein determining whether the control plane signaling data packet is a notification message comprises determining, by the one or more processors, whether the uniform resource identifier further comprises a name of a custom operation.

11. A system, comprising:
one or more processors, coupled to memory, to:

collect, via a probe from a communication channel between a first node and a second node, a control plane signaling data packet comprising a uniform resource identifier and transmitted by the first node to the second node;
identify an identifier of the second node based on a value in an internet protocol (IP) address in the control plane signaling data packet;
determine whether the control plane signaling data packet is a notification message based on a comparison between the uniform resource identifier and a value template, wherein the value template comprises a node-specific URI template predefined for the second node, the node-specific URI template including a parameter derived from the identifier of the second node;
responsive to determining the control plane signaling data packet is a notification message, determine a key performance indicator (KPI) type of the control plane signaling data packet by comparing one or more values of content of the control plane signaling data packet with one or more KPI type determination rules corresponding to the identifier of the second node; and
generate a KPI of the determined KPI type based on content of the control plane signaling data packet.

12. The system of claim 11, wherein the one or more processors identify the identifier of the second node by:
comparing the value with stored values corresponding to node identifiers in a database; and
identifying the identifier of the second node based on the value matching a stored value corresponding to the identifier of the second node in the database.

13. The system of claim 11, wherein the one or more processors determine whether the control plane signaling data packet is a notification message by:
identifying field types of the one or more values of the uniform resource identifier;
comparing the field types to the value template comprising a set of field types; and
determining whether the field types of the one or more values of the uniform resource identifier match the set of field types.

14. The system of claim 13, wherein the one or more processors compare the field types to the value template by comparing the field types to the value template corresponding to a 5G mobile network communication protocol.

15. The system of claim 11, wherein the one or more processors determine the KPI type of the control plane signaling data packet by:
retrieving the one or more KPI type determination rules from a database based on the identifier of the second node;
comparing the one or more values of the uniform resource identifier of the control plane signaling data packet with the one or more KPI type determination rules; and
determining, based on the comparison between the one or more values of the uniform resource identifier with the one or more KPI type determination rules, the one or more values match a KPI type determination rule corresponding to the KPI type.

16. The system of claim 15, wherein the one or more processors compare the one or more values of the uniform resource identifier of the control plane signaling data packet with the one or more KPI type determination rules by determining whether a string of at least one of the one or more values is identical to a string of the one or more KPI type determination rules.

17. The system of claim 11, wherein the one or more processors further:
collect, via the probe from the communication channel between the first node and the second node, a second control plane signaling data packet comprising a second uniform resource identifier and transmitted by the second node to the first node;
determine the second control plane signaling data packet is not a notification message by determining values of the second uniform resource identifier match the value template;
determine the second control plane signaling data packet is a subscription message;
responsive to determining the second control plane signaling data packet is a subscription message, identify an identifier of a subscriber in a payload of the second control plane signaling data packet; and
store the identifier of the subscriber with a signature in a database.

18. The system of claim 17, wherein the one or more processors further:
collect, via the probe from the communication channel between the first node and the second node, a third control plane signaling data packet comprising a third uniform resource identifier and transmitted by the first node to the second node;
determine the third control plane signaling data packet is a notification message by determining values of the third uniform resource identifier do not match the value template;
retrieve the signature from the database; and
determine a KPI type for the third control plane signaling data packet based on content of the third control plane signaling data packet matching the signature.

19. A method comprising:
collecting, by one or more processors via a probe from a communication channel between a first node and a second node, a control plane signaling data packet comprising a uniform resource identifier and transmitted by the first node to the second node;
determining, by the one or more processors, whether the control plane signaling data packet is a notification message based on a comparison between the uniform resource identifier and a value template, wherein the value template comprises a node-specific URI template predefined for the second node, the node-specific URI template including a parameter derived from an identifier of the second node;
responsive to determining the control plane signaling data packet is a notification message, determining, by the one or more processors, a key performance indicator (KPI) type of the control plane signaling data packet by comparing one or more values of content of the control plane signaling data packet with one or more KPI type determination rules corresponding to the identifier of the second node; and
generating, by the one or more processors, a KPI of the determined KPI type based on content of the control plane signaling data packet.

20. The method of claim 19, wherein determining whether the control plane signaling data packet is a notification message comprises:
identifying, by the one or more processors, field types of values of the control plane signaling data packet;
comparing, by the one or more processors, the field types to the value template comprising a set of field types; and determining, by the one or more processors, whether the field types of the values of the control plane signaling data packet match the set of field types.

* * * * *